United States Patent [19]

Beck

[11] Patent Number: 6,134,350
[45] Date of Patent: Oct. 17, 2000

[54] METHOD OF PRODUCING WAVELETS AND COMPRESSING DIGITAL IMAGES AND OF RESTORING THE DIGITAL IMAGES

[75] Inventor: John P. Beck, Tyngsborough, Mass.

[73] Assignee: Dome Imaging Systems, Inc., Waltham, Mass.

[21] Appl. No.: 09/025,663

[22] Filed: Feb. 18, 1998

[51] Int. Cl.$^7$ .............................. G06K 9/36; G06K 9/00; H04N 7/12

[52] U.S. Cl. ......................... 382/240; 382/234; 382/132; 348/398

[58] Field of Search ..................................... 382/240, 232, 382/233, 234, 244, 246, 248, 250, 226, 132, 131; 341/79; 348/384, 398, 397, 390; 386/109

[56] References Cited

U.S. PATENT DOCUMENTS

| | | | |
|---|---|---|---|
| 4,943,855 | 7/1990 | Bheda et al. | 348/398 |
| 5,748,786 | 5/1998 | Zandi et al. | 382/240 |
| 5,845,041 | 12/1998 | Ohkuma et al. | 386/109 |

OTHER PUBLICATIONS

"Digital Image Compression Techniques," M. Rabbani et al., SPIE, Bellingham, WA, 1991, pages 3, 170–189.

*Primary Examiner*—Thomas D. Lee
*Assistant Examiner*—Wen Peng Chen
*Attorney, Agent, or Firm*—Fulwider Patton, et al.; Ellsworth R. Roston

[57] ABSTRACT

To compress a digitized medical image, a first wavelet including quadrants respectively having LL, LH, HL and HH frequencies is provided, preferably in parallel. L and H respectively represent low and high frequency ranges. L and H representations may be respectively provided by averaging, and taking the difference between, two (2) successive pixels values. The first and second letters in each quadrant respectively refer to the frequency range in a pair of co-ordinates. A second wavelet may include, in the first wavelet LL quadrant, quadrants respectively having LL, LH, HL and HH frequency ranges. Successive wavelets may be similarly provided. Each wavelet is provided from the LL quadrant of the previous wavelet because most of the frequency information resides in the LL quadrant. Individual compressions may be provided in parallel of the representations in the LH, HL and HH quadrants in the first wavelet, preferably on a lossy basis (e.g. discrete cosine transform and then Huffman coding). An individual compression may be simultaneously provided of the LL representation in the first wavelet and the LL, LH, HL and HH representations in the second wavelet, preferably on a lossless basis (e.g. Huffman coding). Decompression may be provided by performing the inverse of compression. The pixels may be restored after decompression by reconstructing the pixels from the wavelets in steps inverse to those in obtaining the wavelets. Thus, the information transmissions time is minimized with little reduction loss.

18 Claims, 7 Drawing Sheets

METHOD OF PRODUCING WAVELETS AND COMPRESSING DIGITAL IMAGES AND OF RESTORING THE DIGITAL IMAGES

This invention relates to a method of minimizing the time of processing a medical image, particularly an x-ray image. This invention particularly relates to a method of minimizing the processing time of such a medical image without significantly affecting the resolution of the image. By such a method, medical images can be transmitted substantially on a real time digital basis to a medical specialist displaced from the image location and the digital image can be reconstructed with a high resolution substantially on a real time basis for viewing at the displaced position by the medical specialist.

BACKGROUND OF THE INVENTION

Radiologists view medical images such as x-rays to determine if a patient has problems or deficiencies that are indicated primarily by such medical images. These images preferably have a high resolution in order for the radiologist to make a diagnosis with some confidence of the existence of a medical problem or deficiency in the patient and, if the medical problem or deficiency exists, a diagnosis of the location and seriousness of such medical problem or deficiency. By way of illustration, each x-ray may indicate the existence of a bone fracture in a patient's body or the existence of a cancer in a patient's lung or in a patient's breast. A high resolution in an x-ray image may constitute 5000 pixels in each horizontal line and 4000 lines vertically. To provide a gray scale of a high resolution for each pixel, each pixel in the image may be defined by as many as 12 binary bits.

With increasing frequency in large institutions such as hospitals, the medical images (e.g. x-rays) for a patient are stored at a central location in the hospitals. The radiologist may be displaced in the hospital from such central location. When the radiologist desires to view these medical images, the images are transmitted from the central location to the radiologist's location. One of the most demanding problems in digital radiology today is the presentation of high resolution medical imagery and digital radiographs to a radiologist for reading. For instance in mammography, a study consists of four (4) extremely high resolution views of the tissue, two (2) from the current session and two (2) from a previous session for comparison purposes. As previously indicated, each view can be as large as 4000 (4k) pixels by 5000 (5k) pixels with each pixel 12 bits in depth. Without compression, a single study would consume more than 160 megabytes of digital storage.

To conserve digital storage media as well as network bandwidth, some form of data compression is needed. However, data compression algorithms generally need a large amount of computational power to shrink an image in compression or to expand an image in decompression. For example, a well written software algorithm can process 2 million to 3 million pixels per second when running on today's high end personal computer. A time period between approximately thirty (30) and forty (40) seconds is required to decompress and display an entire study of four (4) images. This time period is clearly unacceptable to a radiologist.

In addition to software, the industry has also developed several JPEG chips that are targeted at the video authoring market. JPEG is a form of digital compression that constitutes a standard in the industry. These chips operate in real time on video data of medium resolution. When this hardware is used, a radiologist would illustratively be able to view a study in about 5 seconds. This delay is on the border of being acceptable to a radiologist but is not acceptable to the radiologist.

BRIEF DESCRIPTION OF THE INVENTION

This invention provides apparatus for, and methods of, processing radiological images by parallel processing techniques. These techniques provide for a reduction in the computation time for compression or decompression by a factor of four (4). The time for the viewing of the study of four (4) images by a medical specialist such as radiologist is accordingly within the range of acceptability to the radiologist.

In decompressing and then compressing a digitized medical image, a first wavelet including quadrants respectively having LL, LH, HL and HH frequencies is provided, preferably in parallel. L represents a low frequency range, H a high frequency range. An L representation may be provided by arranging two (2) successive pixel values, a H representation by determining the difference between these pixel values. The first and second letters in each quadrant respectively refer to the frequency range in a pair of coordinates. A second wavelet is then provided to include, in the first wavelet LL quadrant, quadrants respectively having LL, LH, HL and HH frequency ranges.

Successive wavelets may be similarly provided. Each wavelet is provided from the LL quadrant of the previous wavelet because most of the frequency information resides in the LL quadrant. Individual compressions may be provided in parallel of the representations in the LH, HL and HH quadrants in the first wavelet, preferably on a lossy basis (e.g. discrete cosine transform and then Huffman coding). An individual compression may be simultaneously provided of the LL representation in the first wavelet and the LL, LH, HL and HH representations in the second wavelet, preferably on a lossless basis (e.g. Huffman coding).

Decompression may be provided by performing the inverse of compression. Restoring the pixels after decompression may be provided by reconstructing the pixels from the wavelets in steps inverse to those in obtaining the wavelets. In this way, the information transmission time is minimized with little, if any, resolution loss.

DETAILED DESCRIPTION OF THE INVENTION

Figure 1:
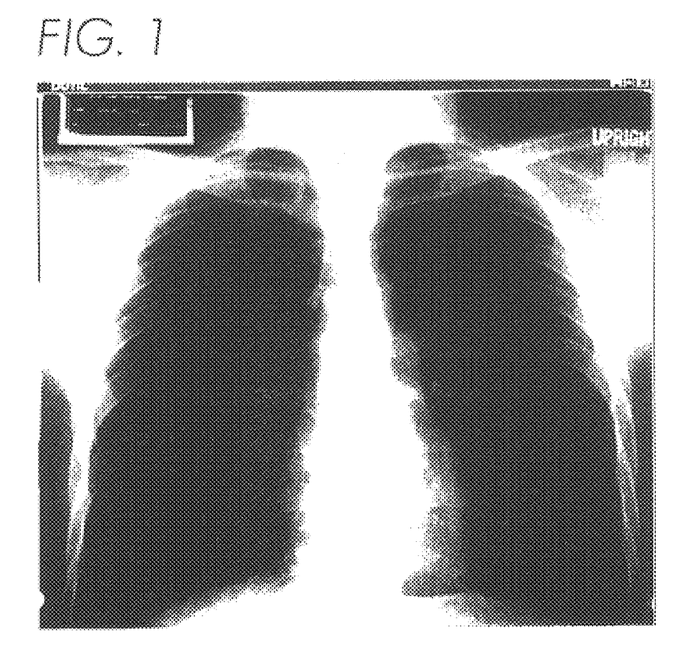
FIG. 1 is a schematic representation of an x-ray image of a patient's chest.
Figure 3:
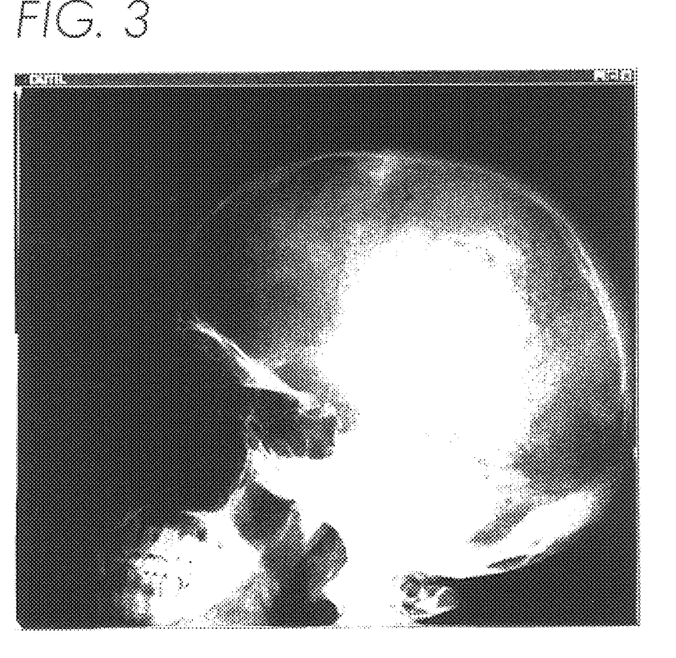
FIG. 3 is a schematic representation of an x-ray image of a patient's head.

A full resolution x-ray image of a patient's chest is schematically shown in FIG. 1 and a full resolution x-ray image of a patient's head is schematically shown in FIG. 3. Such a full resolution image is first separated into a pair of individual frequency bands by using a reversible wavelet transform. The two frequency bands are respectively a low frequency (designated as "L") band and a high frequency (designated as "H") band.

Figure 2:
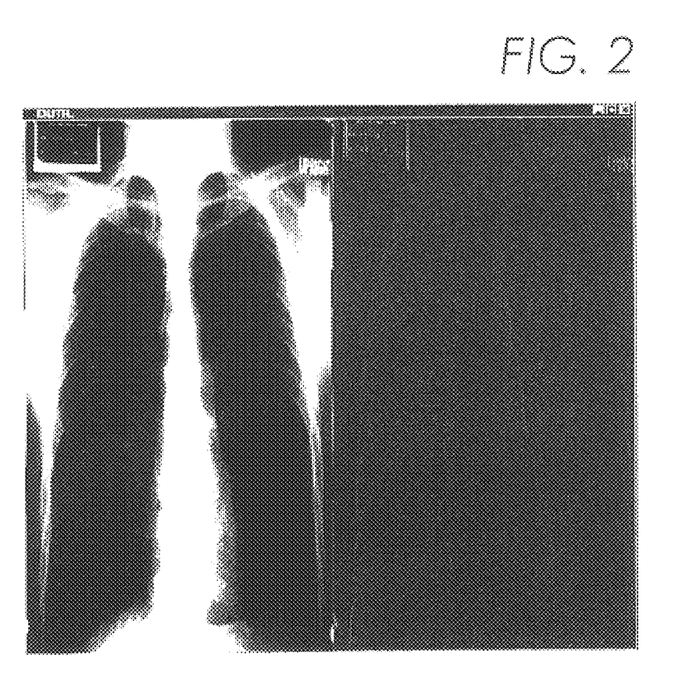
FIG. 2 is a schematic representation of the x-ray image shown in FIG. 1 when the x-ray image is converted in the horizontal direction into a first image with low frequency components and a second image with high frequency components.

Slowly changing image data is contained in the L band and edge transitions (constituting high frequencies) are generally found in the H band. Each sub-band provides one half of the resolution of the original image. FIG. 2 indicates the slowly changing data (the L band) of FIG. 1 in the left half of the Figure and the rapidly changing data (the H band) in the right half of the Figure when a wavelet decomposition is provided in a horizontal direction.

A number of different wavelet transforms may be used to separately provide the L band and the H band of an x-ray image. One of these different alternatives defines a low frequency, or smoothing, filter as the average of a pair of successive input pixels and defines a high frequency, or detail, filter as the difference between the two (2) successive input filters. In the equations below, n represents the index into an array of image pixels p. The smooth, or low frequency, indications are represented by the letter "s" and the detail, or high frequency, indications are represented by the letter "d".

Thus, $$s(n) = \frac{[p(2n) + p(2n+1)]}{2} \quad (1)$$

$$d(n) = p(2n+1) - p(2n) \quad (2)$$

When these functions or equations are applied to an entire image as shown in FIG. 1 and the progressive pixels are taken in the horizontal direction, a pair of output arrays are produced as in FIG. 2, one with low frequency representations as shown in the left half of FIG. 2 and the other with high frequency representations as shown in the right half of FIG. 2. As will be seen from equations 1 and 2, each output array is sub-sampled by two (2) with respect to the input image. The sub-sample effect is created by the 2n component on the right side of equations 1 and 2. Note that there has been no compression of the image in FIG. 2.

The total amount of data in the two (2) images of FIG. 2 is the same as that of the input image shown in FIG. 1. For the particular image shown in FIG. 2, most of the information content is concentrated in the low frequency array constituting the left half of FIG. 2. This observation is based on the near constant shade of the right half of the image. Only sharp edge transitions generate any significant structure in the right half of the image. Since there are only a few sharp edge transitions in the image of FIG. 1, very little information content appears in the right half of FIG. 2. This is true of nearly all medical images.

Although the x-axis has been arbitrarily chosen in the example above as the basis for applying the wavelet transform shown in FIG. 2, traversal along the y-axis would produce corresponding results. In this case, the output image pair would be sub-sampled vertically with the low frequency data in the top half and the high frequency data in the bottom half. Likewise, the top (low frequency) half of the image would contain most of the information content.

A superior approach is to apply the wavelet transform orthogonally in two (2) coordinate directions such as the x and y directions. This is achieved by applying the same transform functions in two (2) separate passes, one pass in one of the x and y directions and the second pass in the other of the x and y directions. The output images from the first pass are used as the input images of the second pass. Since the transform is linear, the order of the pass traversals does not matter.

Figure 4:
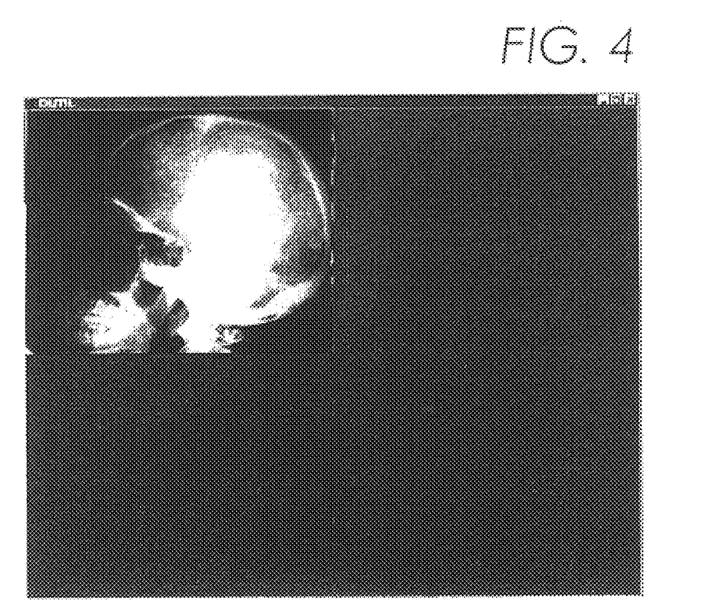
FIG. 4 is a schematic representation of the x-ray image shown in FIG. 3 when the image is decomposed into quadrants each providing an individual combination of low or high frequency components in a first coordinate direction (e.g. horizontal) and low or high frequency components in a second coordinate direction (e.g. vertical)

An example of the two (2) pass transform of the image of FIG. 3 is shown in FIG. 4. The image in FIG. 4 consists of four (4) separate regions or quadrants. The image in the upper left quadrant provides only low frequency information. It may be represented as "LL" where the first "L" indicates low frequency information for the first (e.g. horizontal) pass and the second "L" indicates low frequency information for the second (e.g. vertical) pass. Similarly, the image in the lower right quadrant may be represented as "HH" where high frequency information is provided in both passes. The information in the upper right quadrant may be represented as "HL" where high frequency information is provided in the first (e.g. horizontal) pass and low frequency information is provided in the second (e.g. vertical) pass. The information in the lower left quadrant may be represented as "LH" where low frequency information is provided in the first (e.g. horizontal) pass and high frequency information is provided in the second (e.g. vertical) pass.

Figure 5:
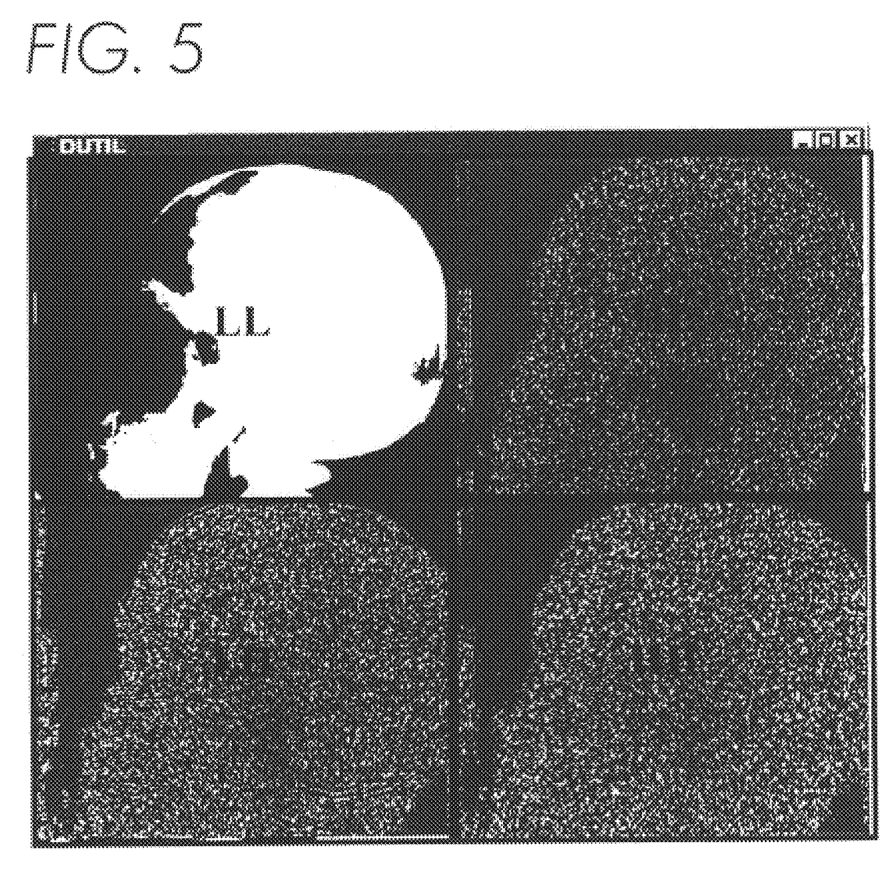
FIG. 5 is a schematic representation of the upper left quadrant of the x-ray image shown in FIG. 4 when the image is decomposed into quadrants each providing an individual combination of low or high frequency components in the first coordinate direction and low or high frequency components in the second coordinate direction.
Figure 6:
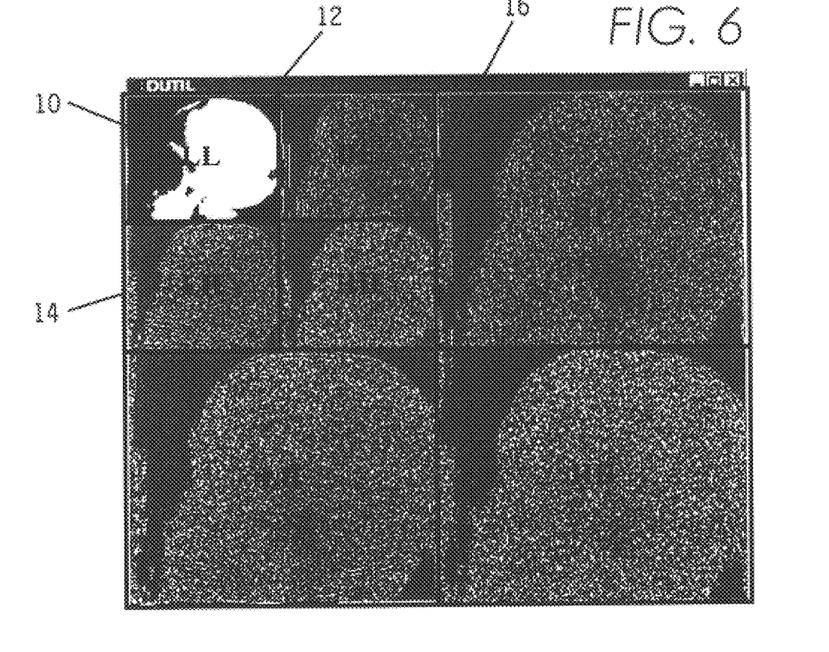
FIG. 6 is a schematic representation similar to that shown in FIG. 5 but with the image in the upper quadrant of FIG. 5 further decomposed into quadrants as shown in the upper left portion of FIG. 6.

The image in FIG. 5 is similar to the image shown in FIG. 4 except that horizontal and vertical lines have been arbitrarily inserted in FIG. 5 to identify the four (4) quadrants LL, HL, LH and HH. In FIG. 6, the upper left quadrant in FIG. 5 is provided with a wavelet transform as shown in FIG. 6. As in FIG. 5, the upper left quadrant of FIG. 6 may be represented as LL to indicate low frequency information in the first (e.g. horizontal) direction and in the second (e.g. vertical) direction. The information in the upper right quadrant in FIG. 6 may be represented as HL to indicate high frequency information in the first (e.g. horizontal) pass and low frequency information in the second (e.g. vertical) pass. The information in the lower left quadrant in FIG. 6 may be represented as LH to indicate low frequency information in the first (e.g. horizontal) pass and high frequency information in the second (e.g. vertical) pass. The information in the lower right quadrant in FIG. 6 may be represented as HH to indicate high frequency information in both passes.

Figure 7:
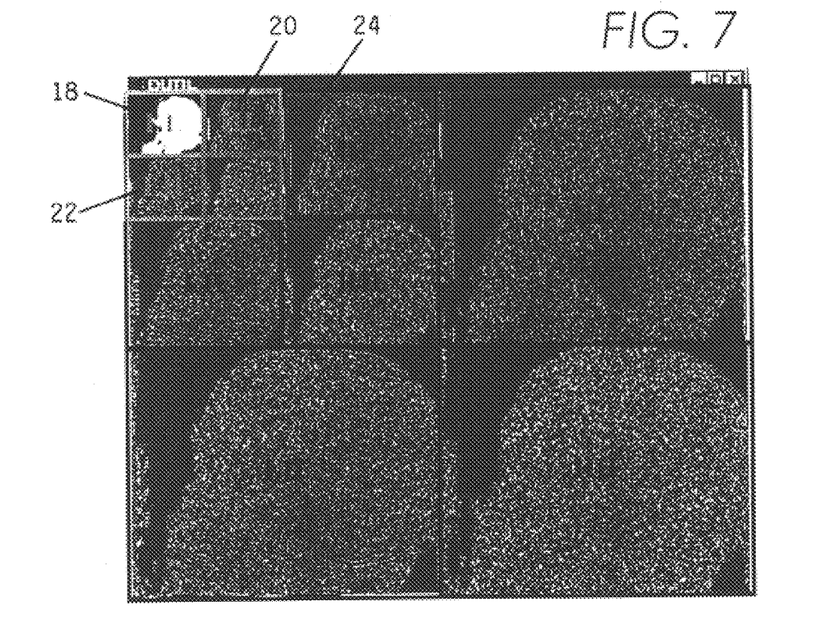
FIG. 7 is a schematic representation similar to that shown in FIGS. 5 and 6 but with the image shown in the upper left portion of FIG. 6 further decomposed into quadrants as shown in the upper left portion of FIG. 7.

Only the portion 10 in FIG. 6 (and not the portions 12, 14 and 16) provides an image of the patient's head. This portion 10 may be subjected to a wavelet transform in a manner similar to the progressive transforms shown in FIGS. 4, 5 and 6. This wavelet transform is shown in FIG. 7. It provides four (4) quadrants 18, 20, 22 and 24 in FIG. 7. Only the quadrant 18 provides a visual indication of the patient's head. It will accordingly be seen that any number of successive wavelet transforms may be provided without departing from the scope of the invention.

Figure 8:
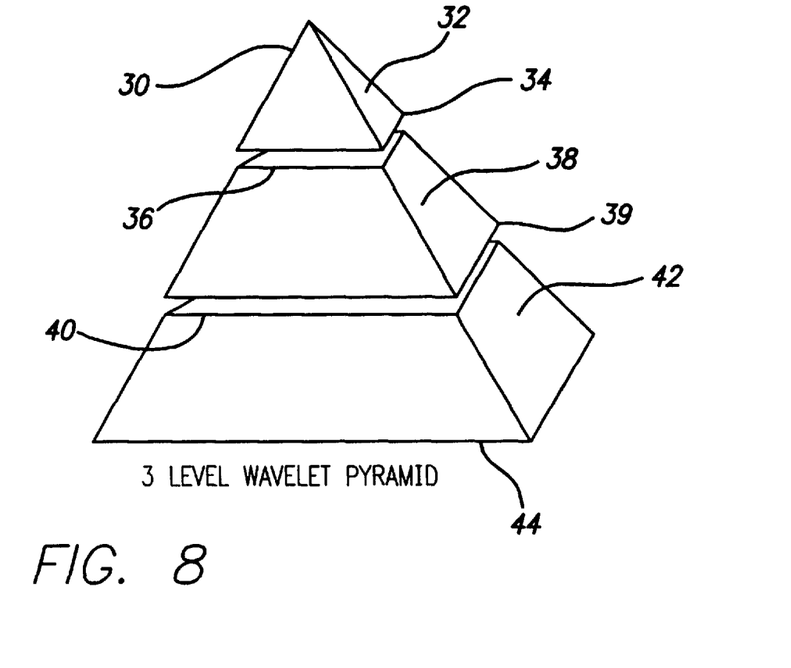
FIG. 8 is a schematic representation of the quadrant conversions shown in FIGS. 5, 6 and 7.

FIG. 8 schematically indicates a 3-level wavelet pyramid. Each level has a base and a peak. The peak 30 of the top level 32 indicates the LL quadrant 18 in FIG. 7. The base 34 of the top level 32 indicates the quadrants 20, 22 and 24 in FIG. 7. The quadrants 18, 20, 22 and 24 in FIG. 7 correspond in area to the quadrant 10 in FIG. 6. The LL quadrant 10 in FIG. 6 constitutes the peak 36 of the middle level 38 in FIG. 8. The quadrants 12, 14 and 16 constitute the base 39 of the middle level 38 in FIG. 8. The quadrants 10, 12, 14 and 16 correspond in area to the LL quadrant in FIG. 5. The LL quadrant in FIG. 5 constitutes the peak 40 of the bottom level 42 in FIG. 8. The base 44 of the bottom level 42 in FIG. 8 is constituted by the other three (3) quadrants in FIG. 5. All four (4) quadrants in FIG. 5 provide the information for the full image shown in FIG. 3. In this way, FIG. 8 provides at the different levels decompositions containing versions representing full, half, quarter and eighth resolutions of the original image shown in FIG. 3.

The total number of wavelet coefficients in the pyramid is equal to the total number of pixels in the original full resolution image. The purpose of the decomposition is to separate the data into sub-bands related by frequency content. A total of (3) (e)+1 sub-bands are provided, where e is the number of levels of the decomposition. As will be seen, FIGS. 5, 6 and 7 represent three (3) levels of decomposition. The data in each sub-band is independent of the others in terms of how that data can be compressed. For the three (3) levels shown in FIGS. 5, 6 and 7 and represented by the pyramid shown in FIG. 8, a total of ten (10) sub-bands may be provided.

An image is reconstructed by traversing the data in the pyramid. This traversal is provided by starting at the top end 30 in FIG. 8 and descending through the levels 32, 38 and 42 in FIG. 8 until the desired resolution is achieved. All data in the levels below the desired level in FIG. 8 are not considered in the process of reconstructing the image because such data does not contribute to the image quality. For example, the data in the level 42 in FIG. 8 may not be reconstructed because only the data in the levels 32 and 38 are desired to be reconstructed. When the method is illustratively applied to a mammogram, a small referral quality image of 640×512 pixels is available from the same pyramid as, but from a different level than, the full 5000×4000 diagnostic quality image.

Compression is provided on any selected ones of the wavelet transforms shown in FIGS. 5, 6 and 7. The compression may be provided on a standard basis such as by a JPEG compression algorithm. The compression is provided only after the wavelet transform has been completed. This permits standardized JPEG hardware or software components to be used in the compression.

The compression may be provided by one or both of two (2) different modes: (1) lossy compression and (2) lossless compression. When the compression is lossless, the digital indications existing before compression may be restored without change after decompression. However, the amount of compression is relatively limited. When the compression is lossy, a high degree of data compression is provided. Because of this, the digital indications provided after decompression are only approximations of the digital indications which existed before compression.

The wavelet decomposition and the compression such as by JPEG standards are completely independent of each other. In other words, the wavelet processing is complete before the JPEG compression begins. This allows standardized JPEG hardware or software components to be used for the JPEG compression. When the image is decomposed by wavelet techniques, the compression such as by JPEG standards becomes accelerated in time relative to the amount of time for compressing the image if the image were not decomposed by the wavelet techniques. In fact, it may be interesting to provide lossless compression at some wavelet levels shown in FIG. 8 and lossy levels at other wavelet levels shown in FIG. 8.

Since the wavelet transform filters the image into low and high frequency bands, a relatively small amount of information will be lost in medical images if the information in the wavelet transform shown in FIG. 5 is not recovered. Alternatively, the information in the full image shown in FIG. 3 could be compressed by lossy techniques with relatively low decrease in image fidelity when the image is recomposed. On the other hand, the two levels 32 and 38 may require compression by lossless method since these are the bases from which the image is recomposed from the image shown in FIG. 6 to the image shown in FIG. 5.

The result of the compression process discussed above is a standard JPEG bit stream. One bit stream is produced for each sub-band image at each level in the hierarchy. As previously described, a total of ten (10) bit streams is produced for the levels of wavelet decomposition shown in FIGS. 5, 6 and 7. The size of each bit stream is roughly inversely proportional to the number of wavelet transforms which have been previously provided. This implies that a bit stream generated at the wavelet transform level 38 in FIG. 8 will be, on average, four (4) times shorter than the length of the bit streams generated at the wavelet transform 42 in FIG. 8 and, on average, four (4) times longer that the lengths of the bit streams generated at the wavelet transform 32 in FIG. 8. Furthermore, the length of each of the LH, HL and HH bit streams in the level 42 should be approximately equal to the sum of the lengths of all of the bit streams in the levels 38 and 32. This observation is derived from the fact that the LL sub-band in the level 42 is recursively decomposed to generate all of the sub-bands in the levels 38 and 32. Similarly, the length of each of the LH, HL and HH bit streams in the level 38 should be equal to the sum of the lengths of the bit streams in the level 32.

Figure 9:
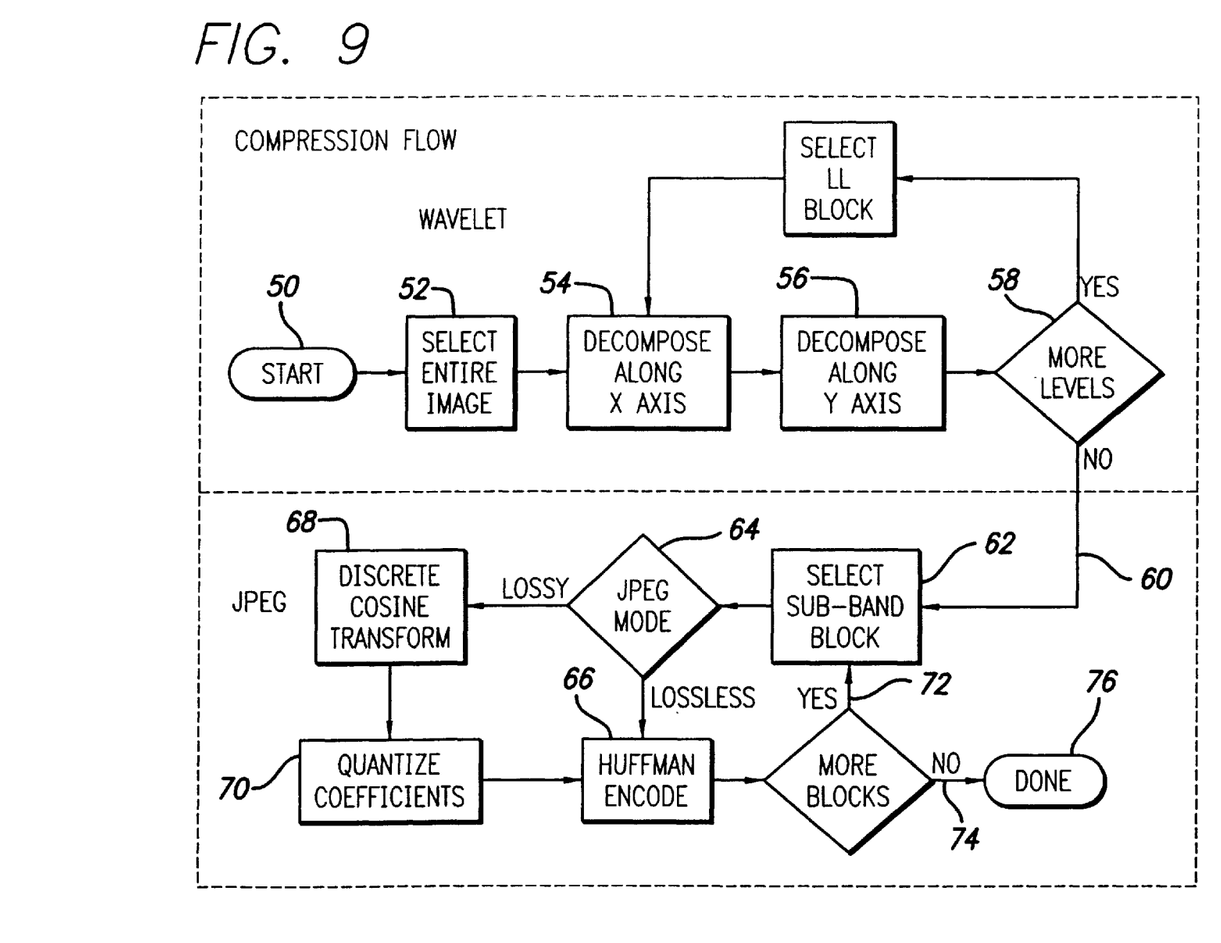
FIG. 9 is a flow chart showing how the quadrant decompositions of FIGS. 4–7 are provided and how compressions of such quadrant decompositions are provided.

FIG. 9 is a schematic flow chart indicating the process of wavelet transform decomposition and then compression. In FIG. 9, the start of the wavelet transform composition is indicated at 50 as "start". The entire image shown in FIG. 3 is then selected as at 52. A wavelet decomposition 54 is thereafter provided along the x-axis and is followed by a wavelet decomposition 56 along the y-axis. A determination is then as at 58 made whether or not additional levels of decomposition are to be provided. If the answer is "Yes" ("Y" in FIG. 9), the LL block 10 in FIG. 6 is selected and decompositions sequentially along the x-axis and y-axis are provided. If the answer is "No", ("N" in FIG. 9), an additional LL block is not selected and decomposition is not provided. This is indicated at 60 in FIG. 9.

The compression is initiated by selecting one of the sub-band blocks such as the sub-band block 20 in FIG. 7. This is indicated at 62 in FIG. 9. Either a lossless compression or a lossy compression is then performed on the selected sub-block. This is indicated at 64 in FIG. 9. If the compression is lossless, the digital information in the selected sub-block is encoded with a Huffman code as at 66. Encoding with a Huffman code is known in the prior art. If compression is lossy, the digital information in the selected sub-band is first subjected to a discrete cosine transform (DCT) as indicated at 68. The values of the components resulting from the discrete cosine transform are then quantified to the nearest integers as indicated at 70 in FIG. 9. This is indicated followed by a Huffman coding shown at 66. A determination is then made as to whether the digital information in additional sub-blocks have to be compressed. If the answer is "Yes", an indication is produced on a line 72 to select an additional sub-block, as indicated at 62, for compression of the digital information in the block. If the answer is "No", an indication is provided on a line 74 to indicate the completion of the compression. This is indicated at 76 by the word "Done".

Figure 11:
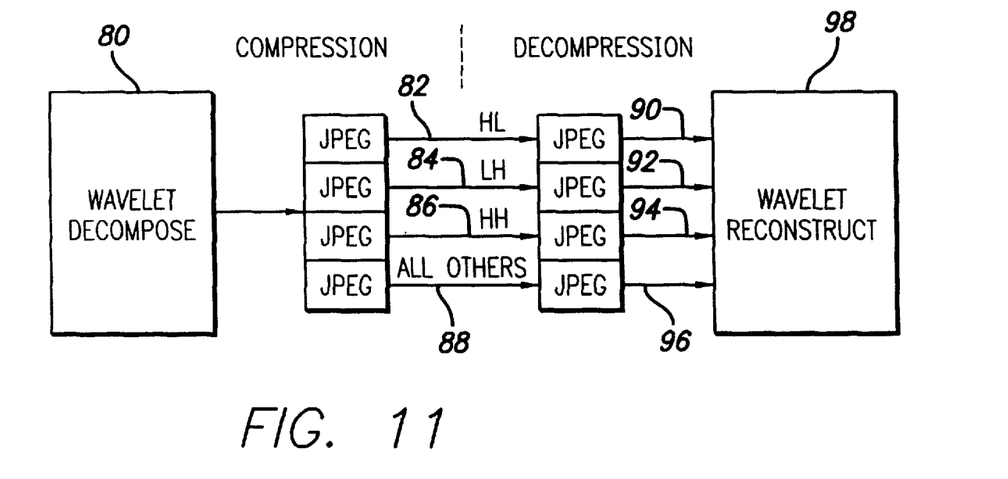
FIG. 11 is a schematic representation of the wavelet decomposition and the compression provided by the flow chart of FIG. 9 and the decompression and the wavelet recomposition provided by the flow chart of FIG. 10.

FIG. 11 is an amplified block diagram of the successive steps of wavelet decomposition followed by compression. The wavelet decomposition is schematically indicated in FIG. 11 by a block 80. The JPEG compression is provided by a plurality of parallel compressions. For example, if the level 40 in FIG. 8 (corresponding to the wavelet decomposition shown in FIG. 6) is chosen, the HL, LH and HH quadrants shown in FIG. 6 are compressed in individual channels 82, 84 and 86 or, on a parallel basis. A compression is simultaneously provided in a fourth channel 88 of the quadrants 12, 14 and 16 in FIG. 6 and the quadrants 18, 20, 22 and 24 in FIG. 7. As will be seen, the amount of the digital information compressed in the channel 88 in FIG. 11 is of the same order of magnitude, but slightly longer, than the amount of the digital information compressed in each of the HL, LH and HH channels 82, 84 and 86 shown in FIG. 11.

To reconstruct the image such as shown in FIG. 3, decompression is provided and then the decompressed image is subjected to the inverse of the wavelet decomposition described above. The decompression is provided on a parallel basis in a plurality of channels 90, 92, 94 and 96 in FIG. 11. When the compression has been provided at the level of the wavelet decomposition transform shown in FIG. 6, the channels 90, 92 and 94 simultaneously decompress the digital information respectively in the HL, LH and HH channels in FIG. 6. At the same time, the channel 96 in FIG. 11 decompresses the quadrant 10 in FIG. 6 and the quadrants 18, 20, 22 and 24 in FIG. 7. After the decompression has been completed in the different channels, a wavelet reconstruction indicated by a block 98 in FIG. 11 is provided.

Figure 10:
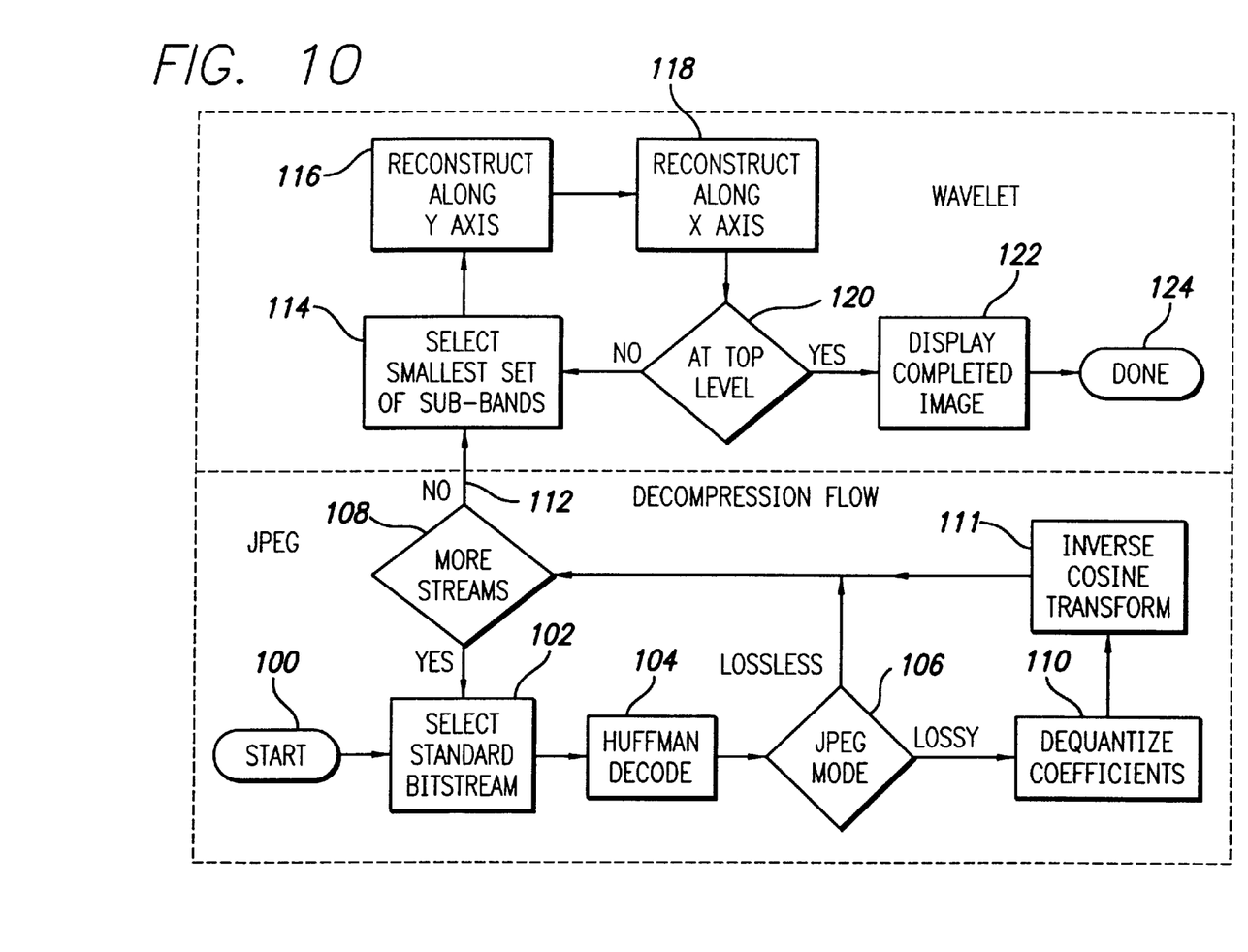
FIG. 10 is a flow chart showing how the images provided as a result of the decomposition and compression in the flow chart of FIG. 9 is decompressed and then recomposed to restore the original image.

FIG. 10 is a flow chart indicating in some detail the operations of decompression and wavelet reconstruction shown in FIG. 11. The operation of the flow chart shown in FIG. 10 is initiated at "start" as at 100. One of the bit streams such as the HL bit stream 12 in FIG. 6 is selected to institute the decompression for that quadrant. It will be appreciated that decompression for the LH and HH quadrants, and for the quadrants 12, 14 and 16 and for the quadrants 18, 20, 22 and 24 in FIG. 7, are simultaneously provided. These simultaneous decompressions may be respectively represented by flow charts similar to that shown in FIG. 10. These additional flow charts will correspond to the flow chart shown in FIG. 10 for the HL quadrant. These additional flow charts are not shown for purposes of simplicity.

As a first step in the decompression process, a standard bit stream such as for the HL quadrant in FIG. 6 is provided. This bit stream is subjected to a Huffman decode as shown at 104 in FIG. 10. A determination is then made as at 106 as to whether the compression provided for the digital bits in that quadrant is lossy or lossless. If the decompression is lossless, a determination is made as at 108 as to whether additional bit streams are to be decompressed. If the answer is "Yes", another bit stream is selected as at 102 and the decompression steps are repeated for that bit stream. If a determination is made as at 106 that the decompression is lossy, the coefficients are dequantized as at 110. In this step, values of coefficients different from integers may be provided. The dequartized coefficients are then subjected to an inverse cosine transform. This is indicated at 111. The digital information provided in the inverse cosine transform is then introduced to the stage 108 to provide a determination, as discussed above, as to whether additional bit streams have to be decompressed.

If a determination is made as at 108 that additional bit streams do not have to be decompressed, a signal is provided on a line 112 to initiate the wavelet reconstruction. If, for example, three (3) levels of wavelet compression have been provided to obtain the quadrants progressively shown in FIGS. 5, 6 and 7, the quadrants shown at 18, 20, 22 and 24 shown in FIG. 7 are initially selected at 114 and are initially processed on a sequential basis. Reconstruction is initially provided for each of the quadrants 18, 20, 22 and 24 initially along the x-axis (see the block 116) and then along the y-axis (see the block 118). A determination is then made at 120 as to whether the digital bit stream in an additional quadrant has to be processed. If the answer is "Yes", another one of the quadrants 18, 20, 22 and 24 is selected for reconstruction along the x-axis and then along the y-axis.

When the reconstruction of the bit stream in each of the quadrants 18, 20, 22 and 24 has been completed, the bit streams in each of the quadrants 10, 12, 14 and 16 in FIG. 6 are sequentially reconstructed, assuming that reconstructions of the bit streams in the quadrants 10, 12, 14 and 16 are desired. Upon the completion of such bit stream reconstructions, the bit streams in the quadrants LH, HL, LH and HH in FIG. 5 are sequentially reconstructed, assuming that reconstructions in the bit streams in such quadrants are desired. Upon the completion of such reconstructions, a determination as at 120 that the reconstruction has been completed. The completed image is then displayed on a monitor as at 122 in FIG. 10 and the processing is done. This is indicated at 124 in FIG. 10.

Although the reconstruction has been discussed above as proceeding progressively through the wavelet transform shown in FIGS. 7, 6 and 5, it will be appreciated that the wavelet transform reconstructions can proceed through less than the wavelet decompositions shown in FIGS. 7, 6 and 5. For example, if it is determined by the radiologist that the reconstruction of the images shown in FIGS. 7 and 6 provide sufficient information, the radiologist does not need to have the quadrants shown in FIG. 5 reconstructed.

To reconstruct the x-ray image from the wavelet transform decompositions, the inverse transform is derived from equations (1) and (2) specified above. These equations generate a pair of adjacent pixels p at an index n in the output image. In these equations, the smooth coefficient s and the detail coefficient d (respectively set forth in equations (1) and (2)) are used as input data. Consistent with the equations (1) and (2) for wavelet transform decomposition, the following are the appropriate equations for wavelet transform reconstructions:

$$p(2n+0) = s(n)\frac{[d(n)+1]}{2} \quad (3)$$

$$p(2n+1) = s(n) - \frac{d(n)}{2} \quad (4)$$

When the techniques described above are applied to very large medical images, they become an enabling technology for the delivery and presentation of mammograms to the radiologist with an acceptable latency. Each full resolution image can be decoded and displayed to about a quarter of one second (¼ sec.). This is well within the time limits considered acceptable to radiologists. It can also be applied to other types of images such as fluoroscopes where high resolution video has to be presented in real time.

Although this invention has been disclosed and illustrated with reference to particular embodiments, the principles involved are susceptible for use in numerous other embodiments which will be apparent to persons of ordinary skill in the art. The invention is, therefore to be limited only as indicated by the scope of the appended claims.

What is claimed is:

1. A method of providing a compression of a medical image, including the steps of:

providing successive wavelet transforms of the medical image, each successive wavelet transform providing quadrants respectively having representations of frequencies of LL, LH, HL and HH where the letter L represents low frequency components and the letter H represents high frequency components and where the first letter representing the frequency range in each quadrant refers to the frequency range in one of two (2) coordinate directions and the second letter in each quadrant refers to the frequency range in the other of the two (2) coordinate directions, and providing individual compressions of the representations of the frequencies in the LH, HL and HH quadrants in the first wavelet transform and an individual compression of the representations of the frequencies in the LL quadrant in the first wavelet transform and the representations of the frequencies in the LL, LH, HL and HH quadrant in each of the successive wavelet transforms.

2. The method as set forth in claim 1, including the steps of:

providing the representations of the frequencies in the LL, LH, HL and HH quadrants in each wavelet transform in sequence, and providing in parallel the individual compression of the representations of the frequencies in the LH, HL and HH quadrants in the first wavelet transform and the individual compression of the representation of the frequencies in the LL quadrant in the first wavelet transform and the representations of the frequencies in the LL, LH, HL and HH quadrants in each of the successive wavelet transforms.

3. The method as set forth in claim 1 wherein the individual compression of the representations of the frequencies in each of the LH, HL and HH quadrants in the first wavelet transform is lossy and wherein the individual compression of the representations of the frequencies in the LL quadrant in the first wavelet transform and of the representations of the frequencies in the LL, LH, HL and HH frequencies in each of the subsequent wavelet transforms is lossless.

4. The method as set forth in claim 2 wherein the individual compression of the representations of the frequencies in each of the LH, HL and HH quadrants in the first wavelet transform is provided initially by a discrete cosine transform and then by a Huffman coding and wherein the individual compression of the representations of the frequencies in the LL quadrant in the first wavelet transform and of the representations of the frequencies in the LL, LH, HL and HH quadrants in each of the successive wavelet transforms is obtained by a Huffman coding.

5. A method of providing a compression of a medical image, including the steps of:

providing a first wavelet transform of the medical image, the first wavelet transform including quadrants respectively having representations of frequencies of LL, LH, HL and HH where the letter L represents a low frequency range and the letter H represents a high frequency range and where the first letter representing the frequency range in each quadrant refers to the frequency range in one of two (2) coordinate directions and the second letter representing the frequency range in each quadrant refers to the frequency range in the other of the two (2) co-ordinate directions, then providing a second wavelet transform with representations of frequencies in the LL quadrant in the first wavelet transform, the second wavelet transform including, in the LL quadrant in the first wavelet transform, representations of the frequencies in the LL, LH, HL and HH quadrants, and providing individual compressions of the representations of the frequencies in each of the LH, HL and HH quadrants in the first wavelet transform and an individual compression of the representation of the frequencies in the LL quadrant in the first wavelet transform and of the representations of the frequencies in the LL, LH, HL and HH quadrants in the second wavelet transform.

6. The method as set forth in claim 5, including the steps of:

providing the representations of the frequencies of the LL, LH, HL and HH quadrants in the first wavelet transform in sequence, providing the representations of the frequencies of the LL, LH, HL and HH quadrants in the second wavelet transform in sequence, and providing in parallel the individual compression of the representations of the frequencies in each of the LH, HL and HH quadrants in the first wavelet transform and the individual compression of the representations of the frequencies in the LL quadrant in the first wavelet transform and of the representations of frequencies in the LL, LH, HL and HH quadrants in the second wavelet transform.

7. The method as set forth in claim 5 wherein the individual compression of the representations of the frequencies in each of the LH, HL and HH quadrants in the first wavelet transform is lossy and wherein the individual compression of the representations of the frequencies in the LL quadrant in the first wavelet transform and the representations of the frequencies in each of the LL, LH, HL and HH quadrants in the second wavelet transform is lossless.

8. The method as set forth in claim 6 wherein the individual compression of the representations of the frequencies in each of the LH, HL and HH quadrants in the first wavelet transform is provided initially by a discrete cosine transform and then by a Huffman coding and wherein the individual compression of the representations of the frequencies in the LL quadrant in the first wavelet transform and the representations of the frequencies in the LL, LH, HL and HH quadrants in the second wavelet transform is provided by a Huffman coding.

9. A method of providing a decompression of an image defined by a decomposition of representations of the images in LL, LH, HL and HH quadrants in each of a sequence of successive wavelet transforms and further defined by individual compressions of the decompositions of the representations of the images in each of the LH, HL and HH quadrants in the first one of the wavelet transforms and by an individual compression of the decompositions of the representations of the images in the LL quadrant in the first one of the wavelet transforms and the decompositions of the representations of the images in the LL, LH, HL and HH quadrants in each of the successive wavelet transforms, including the steps of:

decompressing the individual compressions of the decompositions of the representations of the image in each of the LH, HL and HH quadrants in the first one of the wavelet transforms and the individual compression of the decomposition of the representations of the image in the LL quadrant in the first one of the wavelet transforms and the decomposition of the representations of the image in the LL, LH, HL and HH quadrants in each of the successive wavelet transforms, and reconstructing the decompressed decompositions of the representations of the image in the LL, LH, HL and HH quadrants in each of the wavelet transforms in a sequence inverse to the sequence in which the decompositions of the representations of the image are formed in the LL, LH, HL and HH quadrants in each of the successive wavelet transforms.

10. The method as set forth in claim 9, including the step of:

decompressing in parallel the compressions of the decompositions of the representations of the image in each of the LH, HL and HH quadrants in the first one of the wavelet transforms and decompressing in parallel the compressions of the decompositions of the representations of the image in the LL quadrants in the first one of the wavelet transforms and the compressions of the decompositions of the representations of the image in the LL, LH, HL and HH quadrants in each of the successive wavelet transforms.

11. The method as set forth in claim 9, including the step of:

reconstructing in sequence the decompressed decompositions of the representations of the image in the LL, LH, HL and HH quadrants in each individual one of the wavelet transforms in the sequence, each successive reconstruction in sequence the decompressed decompositions of the representations of the image in the quadrants in each wavelet transform being in an order inverse to the order in which the decompositions of the representations of the image in the quadrants in each of the wavelet transforms is provided.

12. The method as set forth in claim 9, wherein the individual compression of the decomposition of the representations of the image in each of the LH, HL and HH quadrants in the first one of the wavelet transforms is provided initially by a discrete cosine transform and then by a Huffman coding and wherein the individual compression of the decompositions of the representations of the images in the LL quadrant in the first one of the wavelet transforms and in the LL, LH, HL and HH quadrants in each of the successive ones of the wavelet transforms is obtained by a Huffman coding and wherein the compressed representations of the decompositions of the representations of the image in the LL quadrant in the first one of the wavelet transforms and the compressed representations of the decompositions of the representations of the images in the LL, LH, HL and HH quadrants in each of the subsequent wavelet transforms are decompressed to restore such representations to the representations before the compressions provided by the Huffman coding and wherein the compressed decompositions of the representations of the images in each of the LH, HL and HH quadrants in the first one of the wavelet transforms are decompressed initially to restore such representations to the representations before the compressions provided by the Huffman coding and such initially decompressed decompositions of the representations of the images are further decompressed to restore such representations to the representations before the compression provided by the discrete cosine transforms.

13. The method as set forth in claim 12, including the step of:

combining in parallel the decompressed decompositions of the representations of the image in the LL, LH, HL and HH quadrants in each individual one of the wavelet transforms in the sequence, each successive combination in parallel of the decompressed decompositions of the representations of the images in the quadrants in each of the wavelet transforms in the sequence being in an order inverse to the order in which the decompositions of the representations of the images for the quadrants in each of the wavelet transforms in the sequence has been provided.

14. A method of providing a decompression of an image defined by decompositions of the representations of images in LL, LH, HL and HH quadrants in each of a pair of successive wavelet transforms and further defined by individual compressions of the decompositions of the representations of the images in each of the LH, HL and HH quadrants in a first one of the wavelet sequences and by an individual compression of the decompositions of the representations of images in the LL quadrant in the first one of the wavelet transforms and the decompositions of the representations of the images in the LL, LH, HL and HH quadrants in a second one of the wavelet transforms, including the steps of:

decompressing the individual compressions of the decompositions of the representations of the image in each of the LH, HL and HH quadrants in the first one of the wavelet transforms and the individual compression of the decompositions of the representation of the image in the LL quadrant in the first one of the wavelength transforms and the decompositions of the representations of the image in the LL, LH, HL and HH quadrants in the second one of the wavelet transforms, reconstructing the decompressed decompositions of the representations of the images in the LL, LH, HL and HH quadrants in the second one of the wavelet transforms to form the decompressed and reconstructed representation of the image in the LL quadrant in the first one of the wavelet transforms, and then reconstructing the decompressed decompositions of the representations of the images in the LL, LH, HL and HH quadrants in the first one of the wavelet transforms.

15. The method as set forth in claim 14, including the step of:

decompressing in parallel the individual compressions of the decompositions of the representations of the image in each of the LH, HL and HH quadrants in the first one of the wavelet transforms and the individual compressions of the decompositions of the representation of the image in the LL quadrant in the first one of the wavelet transforms and the decompositions of the representations of the image in the LL, LH, HL and HH quadrants in the second one of the wavelet transforms.

16. The method as set forth in claim 14, including the steps of:

combining in parallel the decompressed representations of the reconstructions of the decompositions of the image in the LL, LH, HL and HH quadrants in the second one of the wavelet transforms to form the decompressed representations of the reconstructions of the decompositions of the image in the LL quadrant in the first one of the wavelet transforms, and then combining in parallel the decompressed representations of the reconstructions of the decompositions of the image in the LL, LH, HL and HH quadrants in the first one of the wavelet transforms.

17. The method as set forth in claim 14 wherein the individual compression of the decompositions of the representations of the image in each of the LH, HL and HH quadrants in the first one of the wavelet transforms has been provided initially by a discrete cosine transform and then by a Huffman coding and wherein the individual compression of the decompositions of the representations of the image in the LL quadrant in the first wavelet transform and of the decompositions of the representations of the image in the LL, LH, HL and HH quadrants in the second one of the wavelet transforms has been obtained by a Huffman coding and wherein the compressed decompositions of the representations of the image in the LL quadrant in the first one of the wavelet transforms and the compressed decompositions of the representations of the image in each of the LL, LH, HL and HH quadrants in the second one of the wavelet transforms are decompressed to restore such representations to the representations before the compressions provided by the Huffman coding and wherein the compressed decompositions of the representations of the image in each of the LH, HL and HH quadrants in the first one of the wavelet transforms are initially decompressed to restore such representations to the representations before the compressed decompositions of the representations provided of the image by the Huffman coding and wherein such initially decompressed decompositions of the representations of the image are further decompressed to restore such representations to the decompositions of the representations of the image before the compression provided of the decomposition of the representation of the image by the discrete cosine transform.

18. The method as set forth in claim 17, including the steps of:

combining in parallel the decompressed representations of the reconstructions of the decompositions of the image in the LL, LH, HL and HH quadrants in the second one of the wavelet transforms to form the representations of the reconstructions of the decomposition of the image in the LL quadrant in the first one of the wavelet transforms, and then combining in parallel the decompressed representations of the reconstructions of the decompositions of the image in the LL, LH, HL and HH quadrants in the first one of the wavelet transforms.

* * * * *